L. B. CROUCH
NUT LOCK.
APPLICATION FILED JAN. 21, 1910.
962,321.
Patented June 21, 1910.
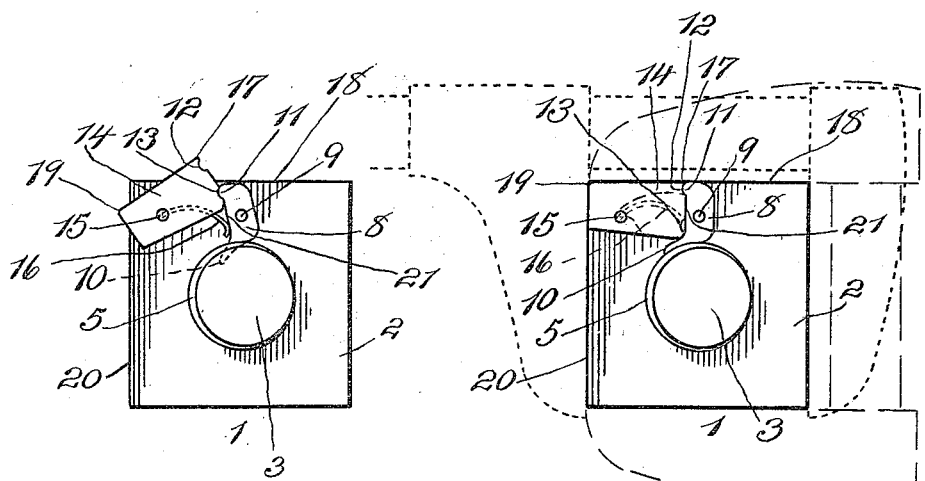
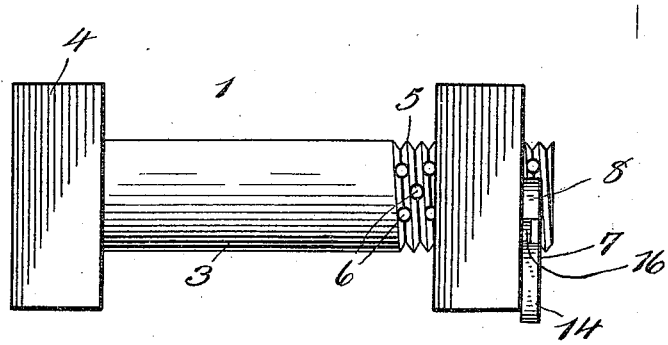

UNITED STATES PATENT OFFICE.

LAWRENCE B. CROUCH, OF MARSHES, WEST VIRGINIA.

NUT-LOCK.

962,321. Specification of Letters Patent. Patented June 21, 1910.

Application filed January 21, 1910. Serial No. 539,284.

*To all whom it may concern:*

Be it known that I, LAWRENCE B. CROUCH, citizen of the United States, residing at Marshes, in the county of Raleigh and State of West Virginia, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to the class of nut locks, and has for its object to provide a device for securely locking a nut and a bolt together and in such manner that the nut will not be accidentally threaded on or off the bolt.

A further object of this invention is to provide a nut lock in which the locking mechanism is carried on the nut and in which the bolt is provided with means to receive the locking mechanism on the nut.

A further object of this invention is to provide a nut lock which is so constructed and arranged that the locking mechanism on the nut can be quickly disengaged from the bolt in order to unthread the nut or to tighten the same on the bolt, which locking mechanism is so arranged that as soon as a wrench is applied to the nut the locking mechanism will be disengaged from the bolt.

With these objects in view this invention consists in providing a pivoted pawl on the face of the nut, and in providing on the face of the nut and in engagement with the pawl a pawl operating member which locks the pawl out of engagement with the bolt, and which also provides a stop to prevent movement of the pawl when the same is in engagement with the bolt.

This invention further consists in certain other novel features of construction and in combinations of parts all of which will be first fully described and afterward specifically pointed out in the appended claims.

Referring to the accompanying drawing: Figure 1 is an elevation of the nut and bolt illustrating the locking mechanism on the nut and in engagement with the bolt. Fig. 2 is a similar view illustrating the locking mechanism out of engagement with the bolt and illustrating a wrench in two dotted positions on the nut, and Fig. 3 is a side elevation of the bolt and nut showing the locking mechanism on the nut.

Like numerals of reference indicate the same parts throughout the several figures in which;

1 indicates the device which comprises the nut 2 and bolt 3, said bolt having a head 4 and a threaded portion 5 which threaded portion 5 is provided with a series of perforations 6.

Applied on the outer face of the nut 2 is a locking mechanism 7, said locking mechanism comprising a pawl 8 pivoted at 9, said pawl being provided with a point 10 for entering the perforations 6 on the bolt 3, and the upper end of the pawl 8 is provided with a projection 11 to enter the recesses 12 and 13 in the pawl operating member 14, said pawl operating member 14 being pivoted to the face of the nut at 15 as clearly shown in the drawing. Secured on the pivot 15 of the pawl operating member 14 is a leaf spring 16 which engages the pawl 8 and normally holds the same in position shown in Fig. 1.

Referring to Fig. 1 it will be seen that the pawl operating member 14 is of such a size and shape that the point 17 projects beyond the side 18 of the nut, and the point 19 projects beyond the side 20 of the nut. Consequently when a wrench is applied to the nut it either engages the point 17 or the point 19 of the pawl engaging member 14 and forces said member in position shown in Fig. 2. The member being forced in this position it engages the side 21 of the pawl 8 and carries same into position shown in Fig. 2, which movement of the pawl raises the point 10 thereof out of engagement with the recesses or perforations 6 in the bolt 3. When the pawl 8 and pawl operating member 14 are in position shown in Fig. 2 the projection 11 on the pawl 8 enters the upper recess 12 in the pawl operating member 14 and the pawl and the operating member become locked together so that the pawl 8 will remain in an unlocked position while the wrench is being changed on the nut or while the nut is being threaded on or off by hand. When it is desired to lock the nut, however, the pawl operating member 14 is raised into position shown in Fig. 1 which causes the projection 11 on the pawl 8 to enter the lower recess 13 on the pawl operating member 14, thus holding the two parts in this position, the said pawl operating member 14 then acting as a stop to limit the movement of the pawl 8 and to insure the nut against unthreading on the bolt, it of course being understood that the normal tendency of a nut on a bolt is to unthread. Consequently it is only necessary to lock the nut against rotation in one direction. While the leaf spring 16 normally holds the point 10 of the pawl 8 within one of the recesses in the bolt 3 it also securely holds the projection 11 on the pawl 8 securely within the recess 13 in the pawl operating member 14, thus in a simple manner providing a very strong, efficient and effectual stop for the pawl 8.

Having thus described the several parts and operation of this invention what I claim as new and desire to secure by Letters Patent of the United States, is:—

1. A nut lock comprising a bolt, a nut, the bolt being provided with a series of perforations in its threaded end, locking mechanism carried on the face of the nut, said locking mechanism comprising a pawl pivoted on the face of the nut and provided with a point adapted to enter the perforations in the bolt, a pawl operating member pivoted on the face of the nut, a spring carried on the face of the nut and engaging the said pawl to normally hold the point thereof within the perforations on the bolt, the said pawl operating member being provided with two recesses, one of which is adapted to receive the said projection on the pawl to maintain the pawl in an unlocked position, the other of which is adapted to receive the projection on the said pawl when the pawl is in a locked position and to form a stop to hold the pawl against rotation on the bolt.

2. A nut lock comprising a bolt, a nut, locking mechanism carried on the nut, said locking mechanism comprising a pawl pivoted to the nut, a pawl operating member pivoted to the nut, said pawl being provided with a point, the said bolt being provided with means to receive the said point, the said pawl being provided with a projection, the said pawl operating member being provided with two recesses, one of which is adapted to receive the said projection on the pawl to maintain the pawl in an unlocked position, the other of which is adapted to receive the projection on the pawl when the pawl is in a locked position and to form a stop to hold the pawl against rotation.

3. A nut lock comprising a bolt, a nut, locking means carried on the nut, said locking means comprising a pawl pivoted on the nut, a pawl operating member pivoted on the nut and in engagement with the said pawl, the said pawl operating member extending beyond two sides of the nut and in such manner as to be engaged when a wrench is applied to the nut, said pawl operating member carrying the said pawl out of engagement with the bolt when the said pawl operating member is engaged by a wrench, the said pawl operating member maintaining the said pawl in an unlocked position and providing a stop for the said pawl when the said pawl is in a locked position.

In testimony whereof, I affix my signature, in presence of two witnesses.

LAWRENCE B. CROUCH.

Witnesses:
C. HUGH DUFFY,
JOHN L. FLETCHER.